United States Patent
Aswani et al.

(10) Patent No.: US 12,483,406 B2
(45) Date of Patent: Nov. 25, 2025

(54) SYNCHRONIZING A SESSION STATE ASSOCIATED WITH AN ACCESS TOKEN BETWEEN AN IDENTITY MANAGER (IDM) AND APPLICATION PROGRAMMING INTERFACE (API) GATEWAY

(71) Applicant: RAKUTEN SYMPHONY, INC., Tokyo (JP)

(72) Inventors: Manoj Aswani, Indore (IN); Hemant Sharma, Indore (IN); Ayus Kumar, Indore (IN); Sagar Kommu, Indore (IN); Neeraj Patidar, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/006,726

(22) PCT Filed: Sep. 27, 2022

(86) PCT No.: PCT/US2022/044876
§ 371 (c)(1),
(2) Date: Jan. 25, 2023

(87) PCT Pub. No.: WO2024/072377
PCT Pub. Date: Apr. 4, 2024

(65) Prior Publication Data
US 2024/0250817 A1 Jul. 25, 2024

(51) Int. Cl.
*H04L 9/40* (2022.01)
*H04L 9/32* (2006.01)
*H04L 41/06* (2022.01)

(52) U.S. Cl.
CPC .............. *H04L 9/32* (2013.01); *H04L 41/06* (2013.01)

(58) Field of Classification Search
CPC .................................. H04L 9/32; H04L 41/06
See application file for complete search history.

(56) References Cited

U.S. PATENT DOCUMENTS

2015/0347209 A1* 12/2015 Lyubinin ............... G06F 9/485
   719/313
2019/0306010 A1* 10/2019 Medam ................. H04L 41/069
2020/0257625 A1*  8/2020 Parakh ............... G06F 12/0897

* cited by examiner

*Primary Examiner* — Thaddeus J Plecha
(74) *Attorney, Agent, or Firm* — HAUPTMAN HAM, LLP

(57) ABSTRACT

Synchronization of a session state of an access token is provided between elements in a system, such as between an Identity Manager (IDM) and an Application Programming Interface (API) Gateway. The IDM generates an access token that is provided to a client device and stores session state information of the access token at a distributed cache. When the client device logs out from the IDM, the IDM removes the session state information from the distributed storage device. The API Gateway is able to request the session state information from distributed storage device. Based on receiving the session state information, the API Gateway authenticates the access token and grants the client device access to an end service. Before requesting the session state information from the distributed storage device, the API Gateway is able to verify the access token is valid and that the access token has not expired.

20 Claims, 8 Drawing Sheets

SYNCHRONIZING A SESSION STATE ASSOCIATED WITH AN ACCESS TOKEN BETWEEN AN IDENTITY MANAGER (IDM) AND APPLICATION PROGRAMMING INTERFACE (API) GATEWAY

RELATED APPLICATIONS

The present application is a National Phase of International Application No. PCT/US2022/044876, filed Sep. 27, 2022.

TECHNICAL FIELD

This description relates to synchronize a session state associated with a token between an Identity Manager (IDM) and Application Programming Interface (API) Gateway.

BACKGROUND

In a cloud architecture, an API Gateway architecture provides access to microservices using an Identity Manager (IDM). An IDM provides a client an access token, such as a JSON (JavaScript Object Notation) Web Token (JWT) token, for authentication of the client. Client applications then use the access tokens to consume secure APIs provided by the API Gateway. An access token has its own expiry time, e.g., an expire time set at a minute, 15 minutes, 30 minutes, etc. The expiry time is set by the IDM.

The client sends a request for access to an application, services, data to the API Gateway with the token generated by the IDM The API Gateway authenticates the token based on signature validation and expiration time. However, a token still persists after the user logs out from the IDM. The persistent token presents a security issue. For example, the token may have an expiration time of 15 minutes and the user logs out after 10 minutes. However, there is still 5 minutes remaining before the token expires. In this case, the state of the token is not synchronized between the IDM and the API Gateway. Thus, whenever another user or the same user attempts to access the API using the same token and without logging in to the IDM, the user is able to access the API within the remaining expiry time, e.g., five minutes.

SUMMARY

In at least embodiment, a method for providing synchronized session state of an access token in a system, includes receiving, from a client device, an access token and a first request for access to an end service, determining whether the access token meets a first condition, in response to the access token being determined to meet the first condition, sending, to a distributed cache maintaining a session state of the access token, a second request for the session state associated with the access token, receiving, from the distributed cache, a session state response indicating the status of the session state associated with the access token, performing authentication of the access token based on the session state response indicating the status of the session state associated with the access token, in response to the status of the session state in the session state response indicating the access token being authenticated, forwarding the first request for access to the end server to the end service, and in response to the status of the session state in the session state response indicating the access token not being authenticated, generating an authentication error.

In at least embodiment, an Application Programming Interface (API) Gateway includes a memory storing computer-readable instructions, and a processor connected to the memory, wherein the processor is configured to execute the computer-readable instructions to receive, from a client device, an access token and a first request for access to an end service, determine whether the access token meets a first condition, in response to the access token being determined to meet the first condition, send a second request for the session state associated with the access token to a distributed cache maintaining a session state of the access token, receive, from the distributed cache, a session state response indicating the status of the session state associated with the access token, perform authentication of the access token based on the session state response indicating the status of the session state associated with the access token, in response to the status of the session state in the session state response indicating the access token being authenticated, forward the first request for access to the end server to the end service, and in response to the status of the session state in the session state response indicating the access token not being authenticated, generate an authentication error.

In at least embodiment, a non-transitory computer-readable media having computer-readable instructions stored thereon, which when executed by a processor causes the processor to perform operations including receiving, from a client device, an access token and a first request for access to an end service, determining whether the access token meets a first condition, in response to the access token being determined to meet the first condition, sending, to a distributed cache maintaining a session state of the access token, a second request for the session state associated with the access token, receiving, from the distributed cache, a session state response indicating the status of the session state associated with the access token, performing authentication of the access token based on the session state response indicating the status of the session state associated with the access token in response to the status of the session state in the session state response indicating the access token being authenticated, forwarding the first request for access to the end server to the end service, and in response to the status of the session state in the session state response indicating the access token not being authenticated, generating an authentication error.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

DETAILED DESCRIPTION

Figure 1:
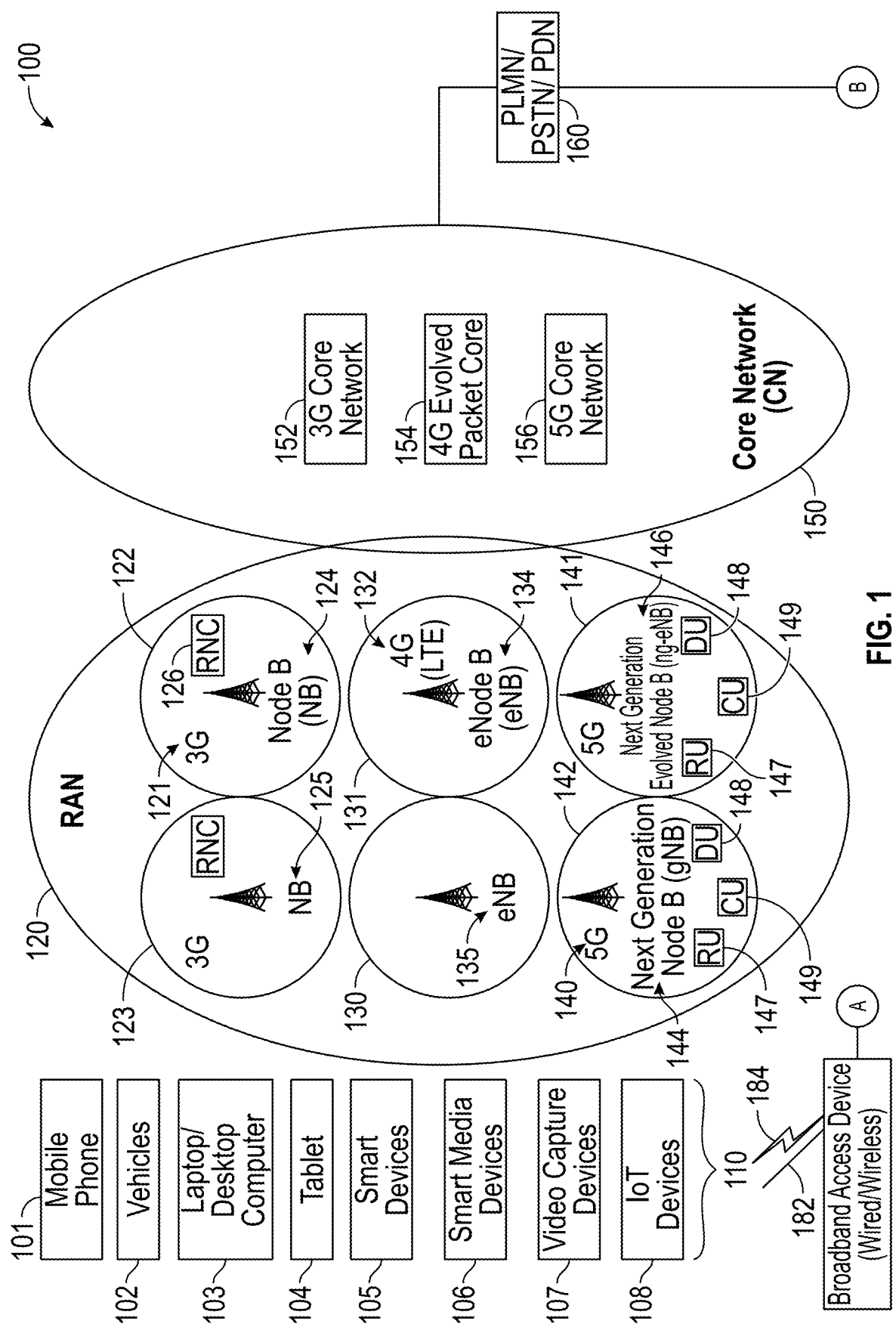
FIG. 1 illustrates a communications network according to at least one embodiment.
Figure 1:
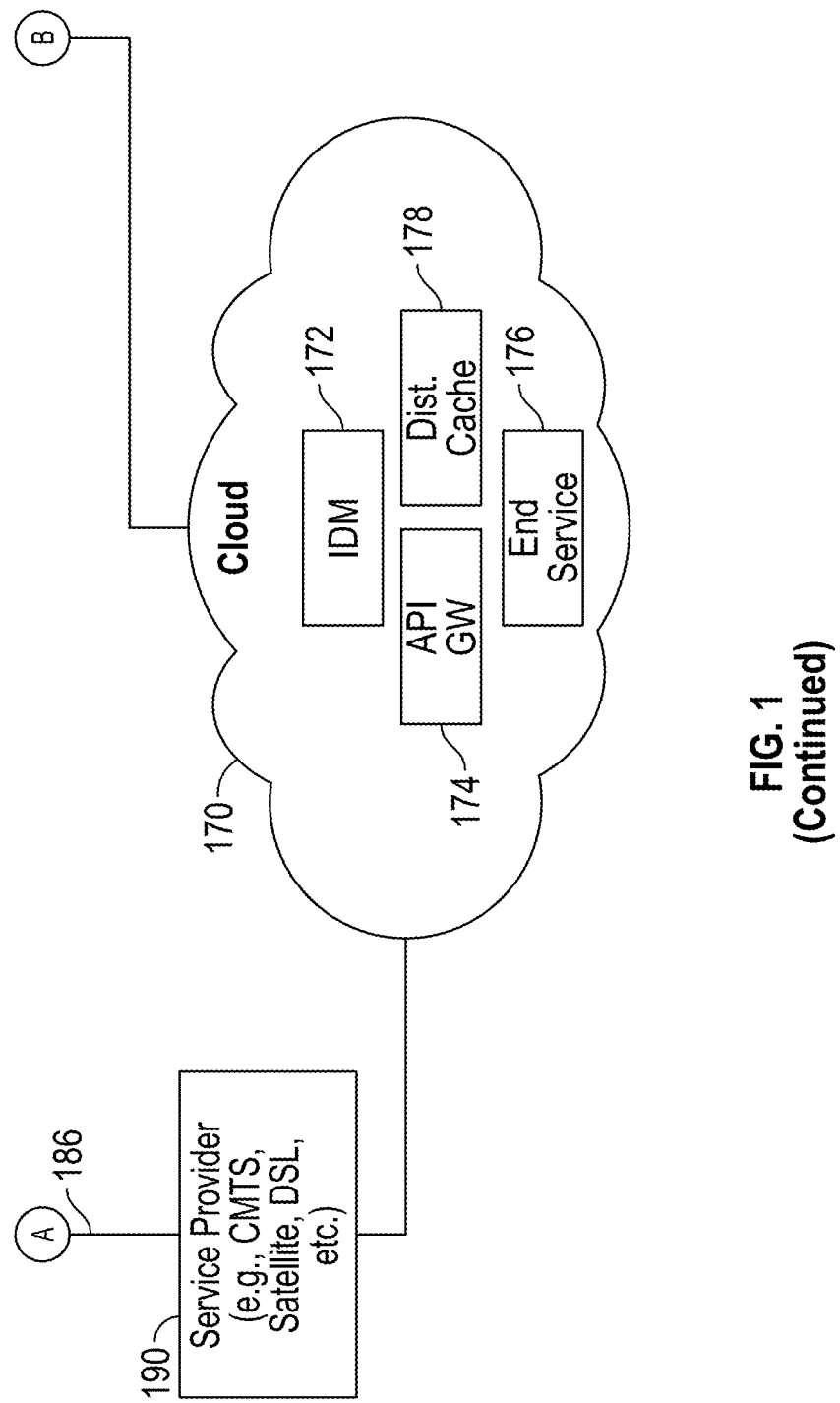

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms "system" and "network" in embodiments of this application are used interchangeably. "At least one" means one or more, and "a plurality of" means two or more. The term "and/or" describes an association relationship between associated objects and indicates that three relationships exist. For example, A and/or B indicate the following cases: Only A exists, both A and B exist, and only B exists, where A and B is singular or plural. The character "/" indicates an "or" relationship between the associated objects. "At least one of" or a similar expression thereof means any combination of items, including any combination of singular items (pieces) or plural items (pieces). For example, "at least one of A, B, and C" includes A, B, C, AB, AC, BC, or ABC, and ""at least one of A, B, or C" includes A, B, C, A and B, A and C, B and C, or A and B and C.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming data-stream or signaling-stream. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming data-stream or signaling-stream from UE.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Embodiments described herein provide synchronization of a session state of an access token between elements in a system, such as between an Identity Manager (IDM) and an Application Programming Interface (API) Gateway. The IDM generates an access token that is provided to a client device. The IDM also stores session state information associated with the access token at a distributed storage device, such as a distributed cache or remote server. When the client device logs out from the IDM, the IDM removes the session state information from the distributed storage device. The API Gateway is able to request the session state information from distributed storage device. Based on receiving the session state information, the API Gateway is able to authenticate the access token and grant the client device access to an end service. Before requesting the session state information from the distributed storage device, the API Gateway is able to verify the access token is valid and that the access token has not expired.

An advantage provided by synchronizing a session state associated with a token at an IDM and API Gateway includes enhanced security so an access token is not able to be used a user logs out of the IDM or the IDM otherwise removes the session state from the distributed cache.

FIG. 1 illustrates a communications network 100 according to at least one embodiment.

In FIG. 1, communications network 100 couples Access Devices 110 through networks to Cloud Data/Services 190. Access Devices 110 include a Mobile Phone 101, Vehicles 102, a Laptop or Desktop Computer 103, a Tablet Computing Device 104, Smart Devices 105, Smart Media Devices 106, Video Capture Devices 107, and Internet-of-Things (IoT) Devices 108. However, this list of Access Devices 110 is provided as examples of types of devices and is not meant to be limiting to embodiments described herein.

Smart Devices 105 include electronic device that connect to other devices or networks via different wireless protocols such as Bluetooth, Zigbee, Near-Field Communication (NFC), Wi-Fi, WiMax, 5G, etc. Smart Devices 105 are able to operate interactively and autonomously. Examples of Smart Devices 105 include smart thermostats, smart doorbells, smart locks, smart refrigerators, smartwatches, smart bands, smart key chains, smart glasses, and others. Smart Devices 105 exhibit properties of ubiquitous computing, including, although not necessarily, machine learning. Smart Media Device 106 are devices that combine one or more of a set-top box, a smart speaker, a voice-visual assistant, an IoT hub, and a remote control. A voice-visual assistant use far-field microphones and speakers to support familiar smart services, such as Google Assistant or Amazon Alexa, with enhanced visual engagement through a television or other display device.

In at least one embodiment, a network for connecting Access Devices 110 to Cloud Data/Services includes a Radio Access Network (RAN) 120 and a Core Network (CN) 150. CN 150 connects Access Devices 110 to Cloud Data/Services 190. RAN 120 connects Access Devices 110 to other parts of a network, e.g., CN 150, through radio connections. RAN 120 is responsible for managing radio resources, including strategies and algorithms for controlling power, channel allocation and data rate. RANs 120 have evolved over time, from 3G to 5G. For example, RANs 120 are implemented in various configurations, such as Global System for Mobile Communications (GSM) RAN (GRAN), GSM Enhanced Data Rates for GSM Evolution (EDGE) RAN (GERAN), Universal Mobile Telecommunications Service (UMTS) Terrestrial RAN (UTRAN), Evolved UMTS Terrestrial RAN (E-UTRAN), Centralized/Cloud RAN (CRAN), Virtualized RAN (VRAN), and Open RAN (ORAN).

In a 3G network 121, RAN 120 includes the base station for Cells Sites 122, 123, which is called a Node B (NB) 124, 125, and a Radio Network Controller (RNC) 126. RNC 126 controls and manages the radio transceivers in Node Bs 124, 125, as well as manages operational functions, such as handoffs, and the radio channels. The RNC 126 handles communication with the 3G Core Network 152.

In a 4G network 132, Cell Sites 130, 131 are implemented using Evolved Node Bs (eNodeBs or eNBs) 134, 135 for the radio base station. The eNodeBs 134, 135 are able to perform the radio access functions that are equivalent to the combined work that Node Bs 124, 125 and RNC do in 3G and connect to the Evolved Packet Core 154.

In a 5G network 140, Cell Sites 141, 142 are implemented using one of two types of RANs: Next Generation Node B (gNodeB) 144 and Next Generation Evolved Node B (ng-eNB) 146. The ng-eNB 146 is an enhanced version of 4G eNodeB and connects 5G UE 110 to the 5G Core Network (5GC) 156 using 4G LTE air interface. The gNB 144 allows 5G UE 110 to connect with a 5GC 156 using 5G NR air interface. The gNBs 144 and ng-eNBs 146 are interconnected by means of the Xn interface. The gNBs 144 and ng-eNBs 146 are also connected by means of the NG interfaces to the 5GC 156.

In 5G, for example, an Open RAN environment is able to be implemented wherein the RAN 120, provided by The gNBs 144 and ng-eNBs 146, is separated into the Radio Unit (RU) 147, the Distributed Unit (DU) 148, and the Centralized Unit (CU) 149. The RU 147 is where the radio frequency signals are transmitted, received, amplified, and digitized. The RU 147 is located near or integrated into, the antenna. The DU 148 and CU 149 are the computation parts of the base station, sending the digitalized radio signal into the network. The DU 148 is physically located at or near the RU 147 whereas the CU 149 is often located nearer the Core Network 150. The different interfaces associated with the Open RAN 120 include the Fronthaul (FH) that lies between the RU 147 and the DU 148, the Midhaul (MH) that lies between the DU 148 and the CU 149, and the Backhaul (BH) that lies between the CU 149 and the Core Network 150.

Core Network (CN) 150 connects RAN 120 to Cloud Data/Services 170. For example, CN 150 is able to connect to Cloud Data/Services 170 through Packet Data Network (PDN) 160, such as a PDN-Gateway. CN 150 provides high-level traffic aggregation, routing, call control/switching, user authentication and charging. The 3G CN 152 involves two different domains: circuit switched elements and packet switched elements. The 4G Evolved Packet Core (EPC) 154 includes four main network elements: the Serving Gateway (S-GW), the packet data network (PDN) Gateway (P-GW), the mobility management entity (MME), and the Home Subscriber Server (HSS). The S-GW routes and forwards data packets from the UE and acts as the mobility anchor during inter-eNodeB handovers. The P-GW acts as an ingress and egress point to the EPC from a PDN (Packet Data Network) such as the Internet. The MME manages UE access network and mobility, as well as establishing the bearer path for User Equipment (UE). The MME is also concerned with the bearer activation/deactivation process. The HSS is the master database for a given subscriber, acting as a central repository of information for network nodes. Subscriber related information held by the HSS includes user identification, security, location, and subscription profile. The EPC is connected to the external networks, which includes the IP Multimedia Core Network Subsystem (IMS). 5GC 156 supports network functions (NFs) associated with the packet core and user data management domains. 5GC 156 provides a decomposed network architecture with the introduction of a service-based interface (SBI), and control plane and user plane separation (CUPS). 5GC decomposes the 4G MME into an Access and Mobility Management Function (AMF) and a Session Management Function (SMF). The AMF receives connection and session related information from the UE, but is responsible for handling connection and mobility management tasks. Messages related to session management are forwarded to the SMF.

In at least one embodiment, a network for connecting Access Devices 110 to Cloud Data/Services includes a Broadband Access Device 180 and a Service Provider 190. Broadband Access Device 180 is a Cable Modem, a Satellite Receiver, a Digital Subscriber Line (DSL) modem, or a Cable Access Gateway. Service Provider 190 is, for example, a streaming video provider or any computer for connecting the Access Devices 110 to Cloud Data/Services 170. Connection 182 represents a wired connection between Access Devices 110 and Broadband Access Device 180. Connection 184 represents a wireless connection between Access Devices 110 and Broadband Access Device 180. Connections 182, 184 between the Access Devices 110 and Broadband Access Device 180, and Connection 186 between Broadband Access Device 180 and Service Provider 190 are implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), or a global Telex network. In at least one embodiment, Connection 182 is a Media Over CoAx (MoCA) network connection or a wired Ethernet connection.

An Identity Manager (IDM) 172 provides an Access Token to Access Devices 110. Access Device 110 provides API Gateway 174 the access token and API Gateway 174 verifies the validity and expiry of the access token before access to End Service 176 is granted. However, a token still persists after the user logs out from the IDM 172. A persistent access token presents a security issue. For example, the access token may have an expiration time of 15 minutes and the user logs out of the IDM 172 after 10 minutes. Thus, there is still 5 minutes remaining before the access token expires. In this case, the state of the token is not synchronized between the IDM 172 and the API Gateway 174. Thus, whenever another user or the same user attempts to access the API Gateway 174 using the same token and without logging in to the IDM 172, the user is able to access the API Gateway 174 within the remaining expiry time, e.g., five minutes. In at least one embodiment, a distributed cache 178 is used to synchronize the session state of the access token between the IDM 172 and the API Gateway 174.

Figure 2:
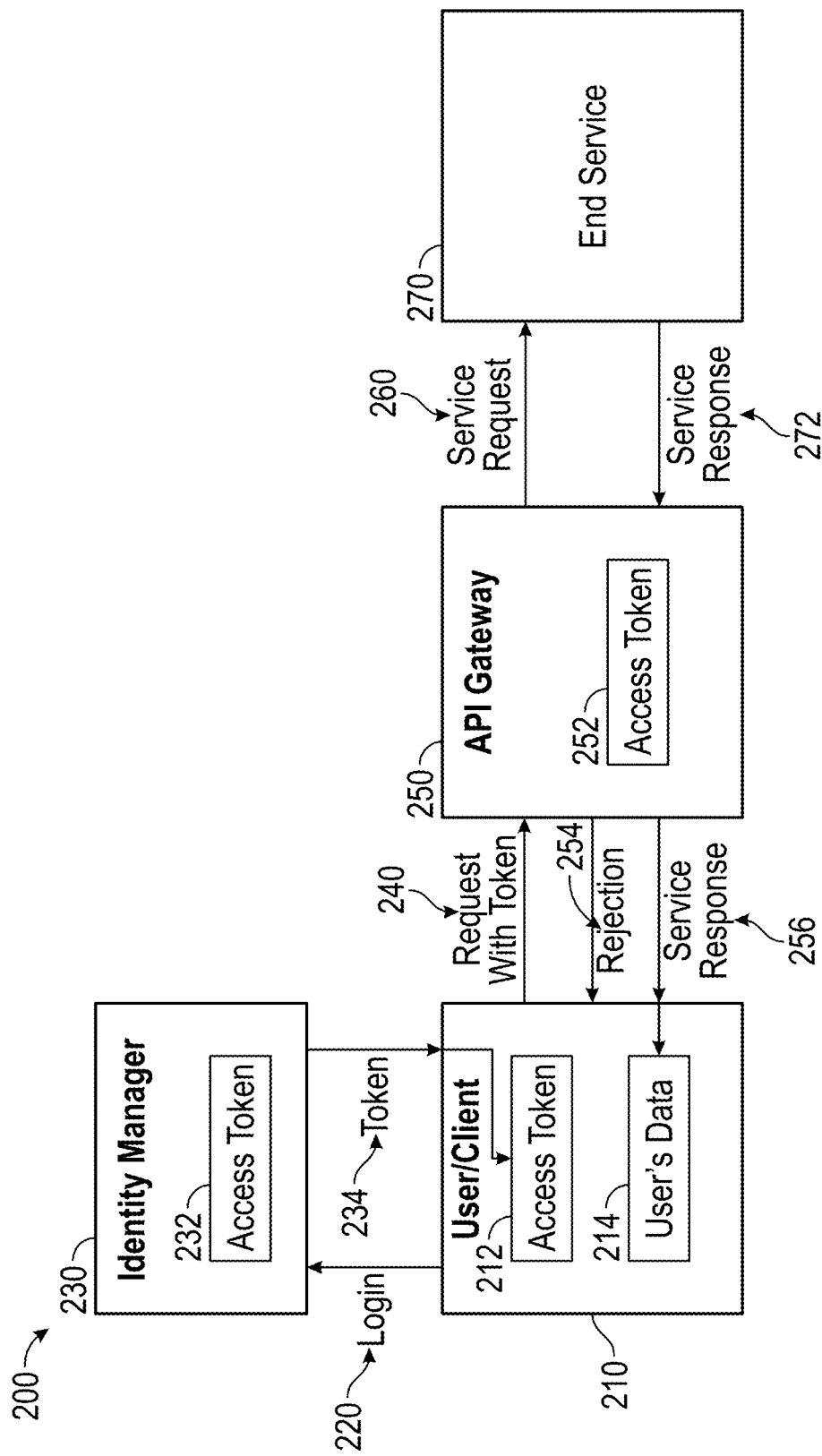
FIG. 2 illustrates Token-Based Access in a Cloud Architecture.

FIG. 2 illustrates Token-Based Access in a Cloud Architecture 200.

In FIG. 2, a User/Client 210 provides a Login Request 220 to Identify Manager (IDM) 230. The Login Request 220 includes parameters for identifying the User/Client 210, such as a username and password. IDM 230 validates the parameters in Login Request 220 and generates an Access Token 232, such as a JSON (JavaScript Object Notation) Web Token (JWT) token. IDM 230 passes the Access Token 234 to User Client 210. User/Client 210 stores the Access Token 212. User/Client 210 sends a Request 240 for access to an application, service, or data to API Gateway 250. Request 240 includes the Access Token 212 so that API Gateway 250 is able to authenticate User/Client 210 based on the Access Token 212. Upon receipt of the Access Token 212, API Gateway 250 stores the Access Token 252. API Gateway 250 decodes the Access Token 252 and analyzes the content to validate the Access Token 252, e.g., to verify information in the Access Token 252 and to verify that Access Token 252 has not been tampered with.

In response to the Access Token 252 not being validated by API Gateway 250, a Rejection 254 is communicated to the User/Client 210. In response to the Access Token 252 being validated, API Gateway 250 also verifies that the Access Token 252 has not expired. Upon determining that the Access Token 252 is valid and has not expired, the API Gateway sends a Service Request 260 to the End Server 270. End Service issues a Service Response 272, e.g., access to an application, service or requested data. For example, in response to End Service being an e-commerce site, the request may be for a list or status of an order. API Gateway 250 provides Service Response 256 to User/Client 210. User/Client 210 stores User's Data 214 obtained via Service Response 256.

However, Access Token 212 was generated with an expiry of 15 minutes. In response to User/Client 210 receiving the Service Response 256 in 10 minutes, Access Token 212 still has 5 minutes before Access Token 212 expires. Access Token 212 still persists after User/Client 210 logs out from IDM 230.

The persistent Access Token 212 presents a security issue because there is still 5 minutes remaining before Access Token 212 expires. The IDM and the API Gateway are not synchronized. Thus, in response to a third party or the same user attempting to access the API Gateway using the same Access Token 212 without logging in, the API Gateway 250 still validates the Access Token 212 and grants access upon validation during the remaining expiry time, e.g., five minutes. The security of User/Client 210 is thus breached.

Figure 3:
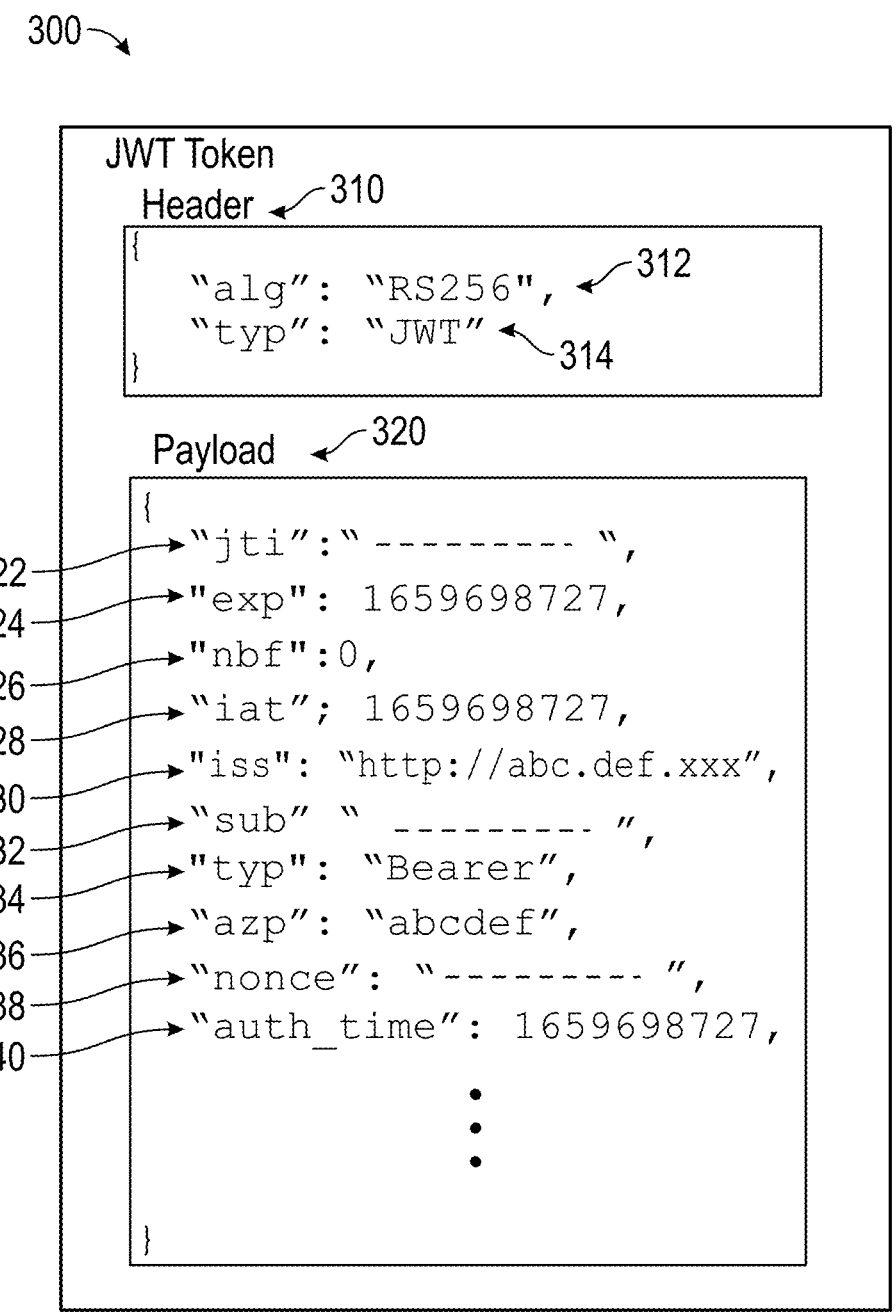
FIG. 3 illustrates a JSON (JavaScript Object Notation) Web Token (JWT) according to at least one embodiment.

FIG. 3 illustrates a JSON (JavaScript Object Notation) Web Token (JWT) 300 according to at least one embodiment.

In FIG. 3, JWT 300 includes a Header 310 and Payload 320. The contents of the Header 310 describe the cryptographic operations to the JWT data. Header 310 includes the information about the algorithm used to generate the signature and the type of the token. Header 310 includes the algorithm property "alg": "RS256" 312 that identifies that the RS256 algorithm was used to generate the signature. RS256 is an abbreviation for RSA Digital Signature Algorithm with SHA-256, which is an Asymmetric Key Cryptography algorithm that uses a Public Key/Private Key pair. The IDM has a Private Key that was used to generate the signature, and the Public Key is available to the API Gateway to validate the signature. Header 310 also includes a type property "typ": "JWT" 314 that identifies that JWT 300 is a JWT token.

Payload 320 includes one or more claim names that provide verifiable security statements. The fields in Payload 320 are referred to as Claims. In FIG. 3, Payload 320 includes "jti" (JWT ID) claim 322 that provides an identifier for the JWT. The "exp" (expiration time) claim 324 identifies the expiration time on or after which the JWT is not to be accepted for processing. The processing of the "exp" claim 324 is used to check that the current date/time is before the expiration date/time listed in the "exp" claim 324. The value of "exp" claim 324 is a JSON number representing the number of seconds from Jan. 1, 1970 00:00:00 as measured in Coordinated Universal Time (UTC) until the date/time.

The "nbf" (not before) claim 326 identifies the time before which the JWT is not to be accepted for processing. The processing of the "nbf" claim 326 is used to check that the current date/time is after or equal to the not-before date/time listed in the "nbf" claim 326. The "iat" (issued at) claim 328 identifies the time at which the JWT was issued. The "iat" claim 328 is us used to determine the age of the JWT. The "iss" (issuer) claim 330 identifies the principal that issued the JWT. The "sub" (subject) claim 332 identifies the principal that is the subject of the JWT. The "sub" claim 332 is normally a statement about the subject.

The "typ" (type) claim 334 is used by JWT applications to declare the media type, e.g., IANA.MediaTypes, of the JWT. The "azp" (authorized party) claim 336 is an optional claim that is used to identify the party to which JWT 300 was issued. If present, the "azp" claim 336 includes the OAuth 2.0 Client ID of the party. The "azp" claim 336 is used in response to the ID Token having an audience value and that audience is different than the authorized party.

The "nonce" (value used to associate a Client session with an ID Token) claim 338 is a string value used to associate a Client session with JWT 300, and to mitigate replay attacks. The value is passed through unmodified from the Authentication Request. In response to being present in the JWT 300, Clients verify that the nonce Claim Value is equal to the value of the nonce parameter sent in the Authentication Request. In response to being present in the Authentication Request, Authorization Servers include a nonce Claim in the JWT 300 with the Claim Value being the nonce value sent in the Authentication Request. The "auth_time" (time authentication occurred) claim 340 identifies the time when the End-User authentication occurred. Those skilled in the art will recognize that JWT is able to include fewer or more Claims than described herein with regard to FIG. 3.

In at least one embodiment, an API Gateway is able to validate a signature for the JWT 300. A signature for the JWT 300 is the encrypted, hashed header 310 and payload 320. In addition to validating the signature of the JWT 300, an API Gateway is able to validate claims 322-340 in the Payload 320 based on information in the claims 322-340. The claims 322-340 include information, such as information about the token issuer, token expiration, intended audience for the token, information binding the token to the authorization request, etc. This information in claims 322-340 provides details that the signature validation alone does not. For instance, examination of claims 322-340 is able to reveal whether a technically valid token was actually intended for a different application or user, whether the JWT 300 has expired, or whether the JWT 300 is from an issuer that the application has no affiliation with, etc.

Figure 4:
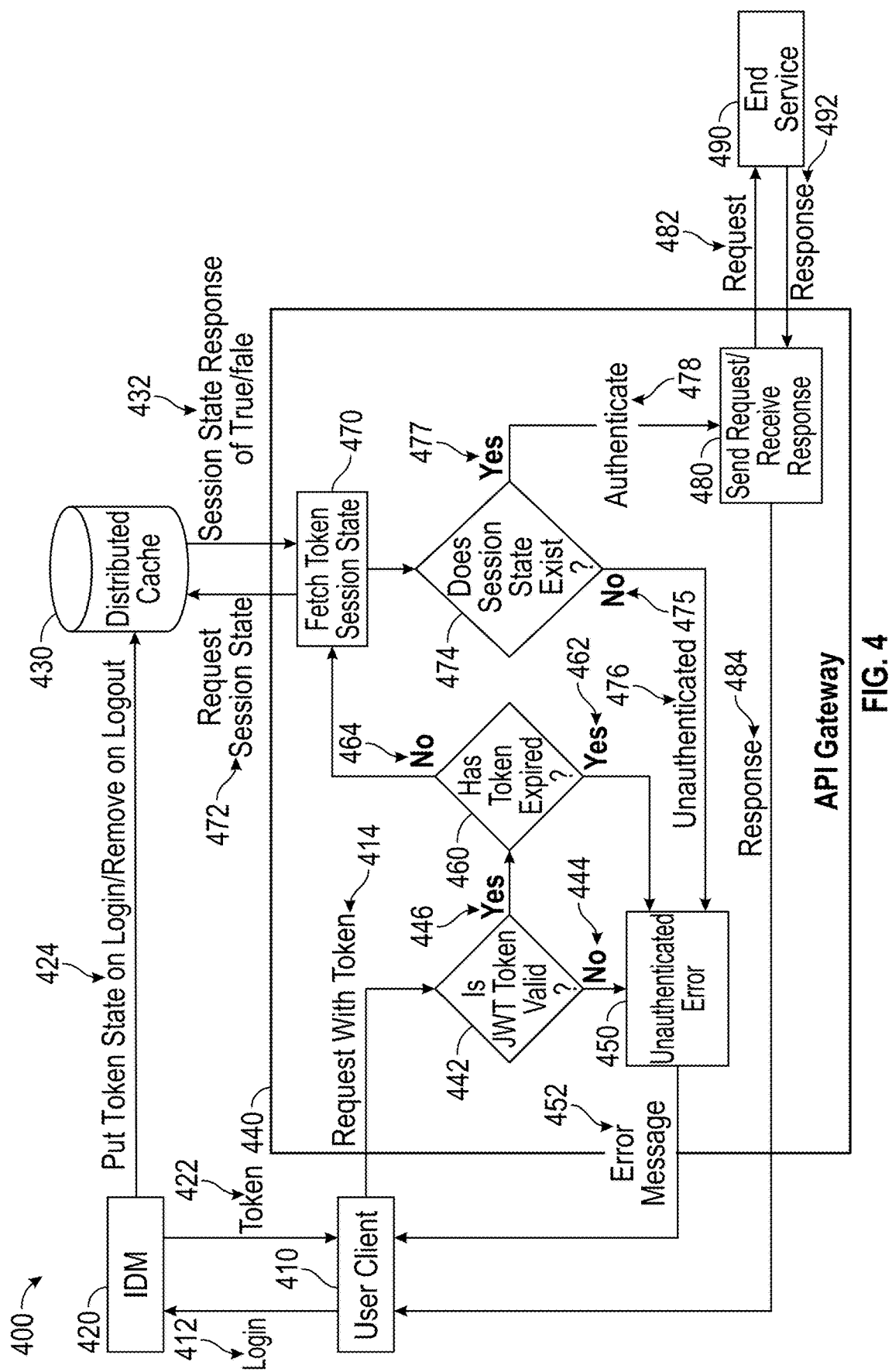
FIG. 4 illustrates use of a Distributed Cache according to at least one embodiment.

FIG. 4 illustrates use of a Distributed Cache 400 according to at least one embodiment.

In FIG. 4, a User/Client 410 provides a Login Request 412 to Identify Manager (IDM) 420. The Login Request 412 includes parameters for identifying the User/Client 410, such as a username and password. IDM 420 validates the parameters in Login Request 420 and generates an Access Token 422, such as a JSON Web Token (JWT) token. For example, Access Token 422 is used for a particular application, and there are Access Tokens 422 for multiple applications. IDM 420, upon Login of the User/Client 410, Puts the Token State 424 to the Distributed Cache 430, and upon Logout of the User/Client 410, Removes the Token State 424 from the Distributed Cache 430. IDM 420 passes the Access Token 422 to User Client 410.

User/Client 410 sends a Request With Token 414 for access to an application, service, or data to API Gateway 440. API Gateway 440 determines whether the Token 422 is valid 442. In response to the Token 422 not being valid 444, an Unauthenticated Error is determined 450 and an Error Message 452 is sent to User/Client 410. In response to the Token 422 being valid 446, the API Gateway 440 determines whether the token has expired 460.

In response to the token being expired 462, an Unauthenticated Error is determined 450 and an Error Message 452 is sent to User/Client 410. In response to the token not being expired 464, the Fetches the Token Session State 470. A Request for Session State 472 is sent to the Distributed Cache 430.

Distributed Cache 420 provides a Session State Response 424, wherein Session State Response 424 is "True" in response to the session state being stored in the Distributed Cache 430 or Session State Response 424 is "False" 432 in response to the session state being removed from the Distributed Cache 430. Fetch Token Session State 470 determines from the Session State Response 432 whether the Session State Exists 474.

In response to the Session State Response 432 indicating the session state does not exist 475, Access Token 422 provided with Request 414 is Unauthenticated 476 and an Unauthenticated Error is determined 450 and an Error Message 452 is sent to User/Client 410. In response to the Session State Response 432 indicating the session state exists 477, an Authenticate message is generated 478.

Upon receiving the Authenticate message 478, Send Request/Receive Response 480 sends a Request 482 (based on Request With Token 414) to End Service 490. End Service 490 generates Response 492. Send Request/Receive Response 480 receives Response 492 and sends Response 484 to User/Client 410.

Accordingly, in at least one embodiment, a distributed cache is used to synchronize the IDM 420 and the API Gateway 440. As described above with reference to FIGS. 2-3, Gateway API 440 analyzes the token to determine whether the token is valid. Gateway API 440 then determines whether the token has expired and whether the Session State is available in the Distributed Cache 430. For example, in response to the user logging out from the IDM 420, the IDM 420 removes or changes the session state for the token issued earlier to the user. Although the API Gateway 440 is not aware that the user logged out from the IDM 420, the API Gateway 440 is still able to be synchronized with the IDM 420 about the session state by fetching the Session State Response 432 from the Distributed Cache 430.

Figure 5:
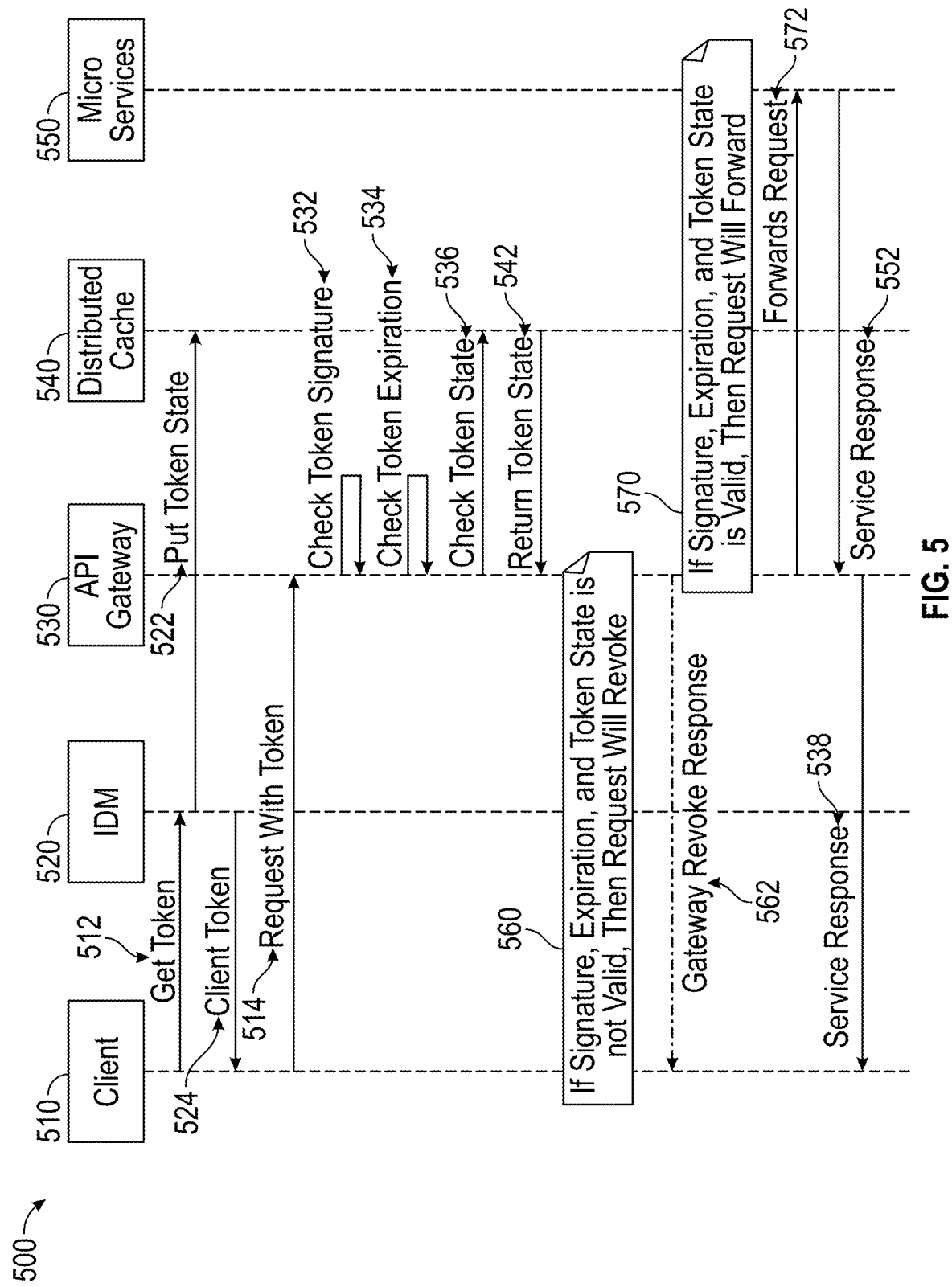
FIG. 5 illustrates a call flow for synchronizing a token state for a token according to at least one embodiment.

FIG. 5 illustrates a call flow 500 for synchronizing a token state for a token according to at least one embodiment.

In FIG. 5, a client 510 sends a Request for a Token 512 to IDM 520. For example, in at least one embodiment, the token is a JWT. IDM 520 validates the Request for the Token 512. IDM 520 Puts Token State 522 in Distributed Cache 540. IDM 520 sends the Client Token 524 to Client 510.

Client 510 sends a Request With Token 514 for access to an application, service, or data to API Gateway 530. API Gateway 530 determines whether the token in Request 514 is valid.

API Gateway 530 checks the signature of the token 532. As described above with reference to FIG. 3, a JWT 300 includes a Header 310 and Payload 320. A signature for the JWT 300 is the encrypted, hashed header 310 and payload 320.

API Gateway 530 then checks the Token Expiration 534. Once the signature and expiration of the token has been checked, the API Gateway 530 Checks the Token State 536 by sending a request to the Distributed Cache 540 for the token state. The Distributed Cache 540 Returns the Token State 542.

In response to at least one of the Signature, Expiration, and Token State being invalid, the Request With Token 514 is revoked 560. The Request With Token 514 is revoked by the API Gateway 530 by sending a Gateway Revoke Response 562 to the Client 510.

In response to the Signature, Expiration, and Token State being valid, the Request is forwarded 570. The API Gateway 530 Forwards the Request 572 to the Micro Services 550. Micro Services sends a Service Response 552 to API Gateway 530. API Gateway 530 then sends the Service Response 538 to Client 538.

In at least one embodiment, Distributed Cache 540 is used to synchronize token state at IDM 520 and API Gateway 530. For example, in response to the user logging out from the IDM 520, the IDM 520 removes or changes at Distributed Cache 540 the token state for the token issued earlier to the user. Although the API Gateway 530 is not aware that the user logged out from the IDM 520, the API Gateway 530 is still able to synchronize the token state associated with the token with IDM 520 by obtaining Token State Response 542 from the Distributed Cache 540.

Figure 6:
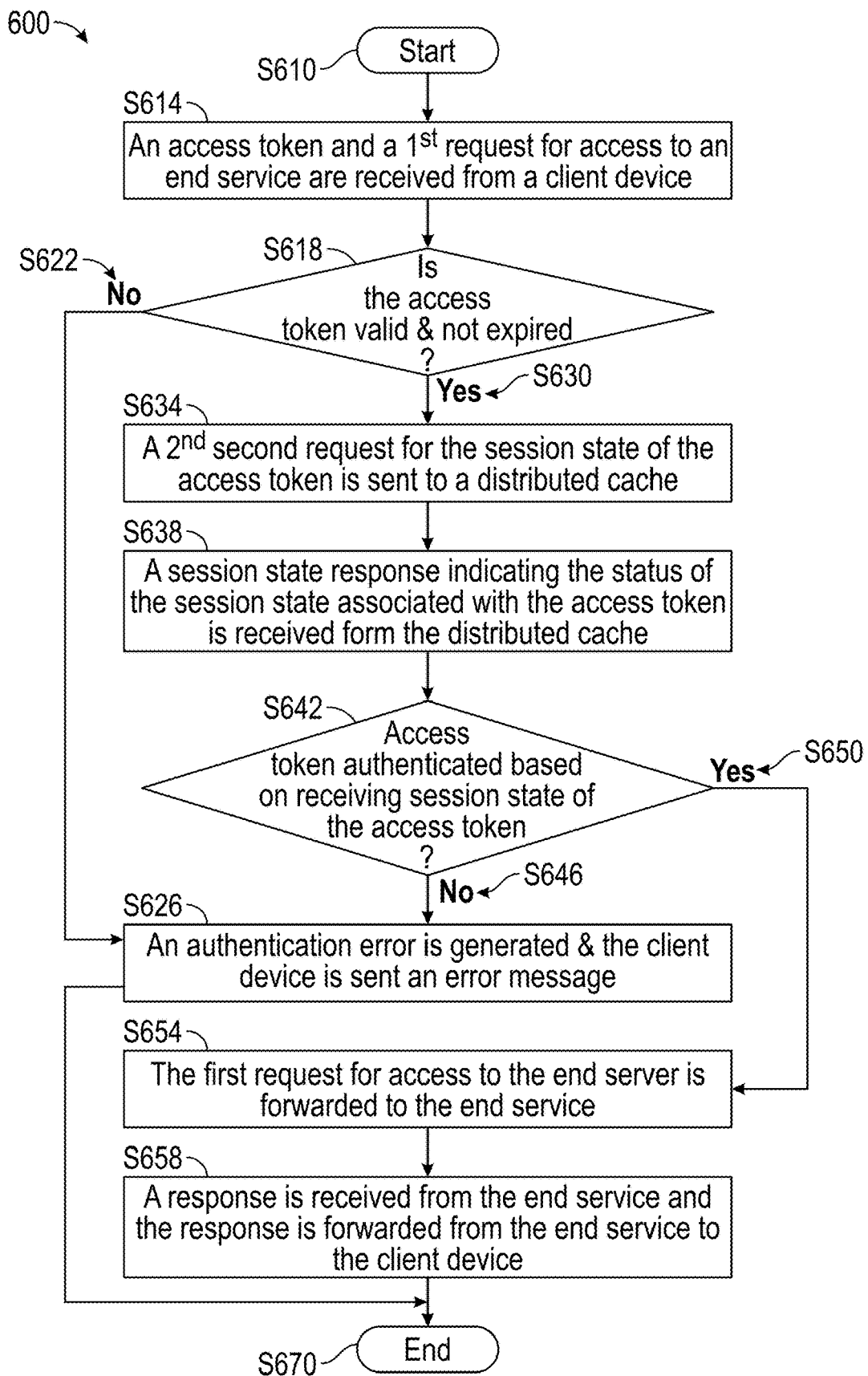
FIG. 6 is a flowchart of a method for synchronizing a session state associated with a token at an Identity Manager (IDM) and Application Programming Interface (API) Gateway according to at least one embodiment.

FIG. 6 is a flowchart 600 of a method for synchronizing a session state associated with a token at an Identity Manager (IDM) and Application Programming Interface (API) Gateway according to at least one embodiment.

In FIG. 6, the process starts S610 and an access token and a first request for access to an end service are received from a client device S614. Referring to FIG. 4, User/Client 410 sends a Request With Token 414 for access to an application, service, or data to API Gateway 440.

A determination is made whether the access token is valid and has not expired S618. Referring to FIG. 4, API Gateway 440 determines whether the Token 422 is valid 442. The API Gateway 440 determines whether the token has expired 460.

In response to the access token being invalid or expired S622, an authentication error is generated and the client device is sent an error message in response to the authentication error being generated S626. Referring to FIG. 4, an Unauthenticated Error is determined 450 and an Error Message 452 is sent to User/Client 410.

In response to the access token being valid and not expired S630, a second request for the session state associated with the access token is sent to a distributed cache maintaining a session state of the access token S634. Referring to FIG. 4, in response to the token not being expired 464, the Fetches the Token Session State 470. A Request for Session State 472 is sent to the Distributed Cache 430.

A session state response indicating the status of the session state associated with the access token is received from the distributed cache S638. Referring to FIG. 4, Distributed Cache 420 provides a Session State Response 424, wherein Session State Response 424 is "True" in response to the session state being stored in the Distributed Cache 430 or Session State Response 424 is "False" 432 in response to the session state being removed from the Distributed Cache 430.

A determination is made whether the access token is authenticated based on receiving the session state of the access token S642. Referring to FIG. 4, Fetch Token Session State 470 determines from the Session State Response 432 whether the Session State Exists 474.

In response to the status of the session state in the session state response indicating the access token not being authenticated S646, an authentication error is generated and an error message is sent to the client device S626. Referring to FIG. 4, in response to the Session State Response 432 indicating the session state does not exist 475, an Unauthenticated Error is determined 450 and an Error Message 452 is sent to User/Client 410.

In response to the status of the session state in the session state response indicating the access token being authenticated S650, the first request for access to the end server is forwarded to the end service S654. Referring to FIG. 4, in response to the Session State Response 432 indicating the session state exists 477, an Authenticate message is generated 478. Upon receiving the Authenticate message 478, Send Request/Receive Response 480 sends a Request 482 (based on Request With Token 414) to End Service 490.

A response is received from the end service and the response is forwarded from the end service to the client device S658. Referring to FIG. 4, End Service 490 generates Response 492. Send Request/Receive Response 480 receives Response 492 and sends Response 484 to User/Client 410.

The process then ends S670.

At least one embodiment for synchronizing a session state associated with a token at an Identity Manager (IDM) and Application Programming Interface (API) Gateway includes receiving, from a client device, an access token and a first request for access to an end service, determining whether the access token meets a first condition, in response to the access token being determined to meet the first condition, sending, to a distributed cache maintaining a session state of the access token, a second request for the session state associated with the access token, receiving, from the distributed cache, a session state response indicating the status of the session state associated with the access token, performing authentication of the access token based on the session state response indicating the status of the session state associated with the access token, in response to the status of the session state in the session state response indicating the access token being authenticated, forwarding the first request for access to the end server to the end service, and in response to the status of the session state in the session state response indicating the access token not being authenticated, generating an authentication error.

Figure 7:
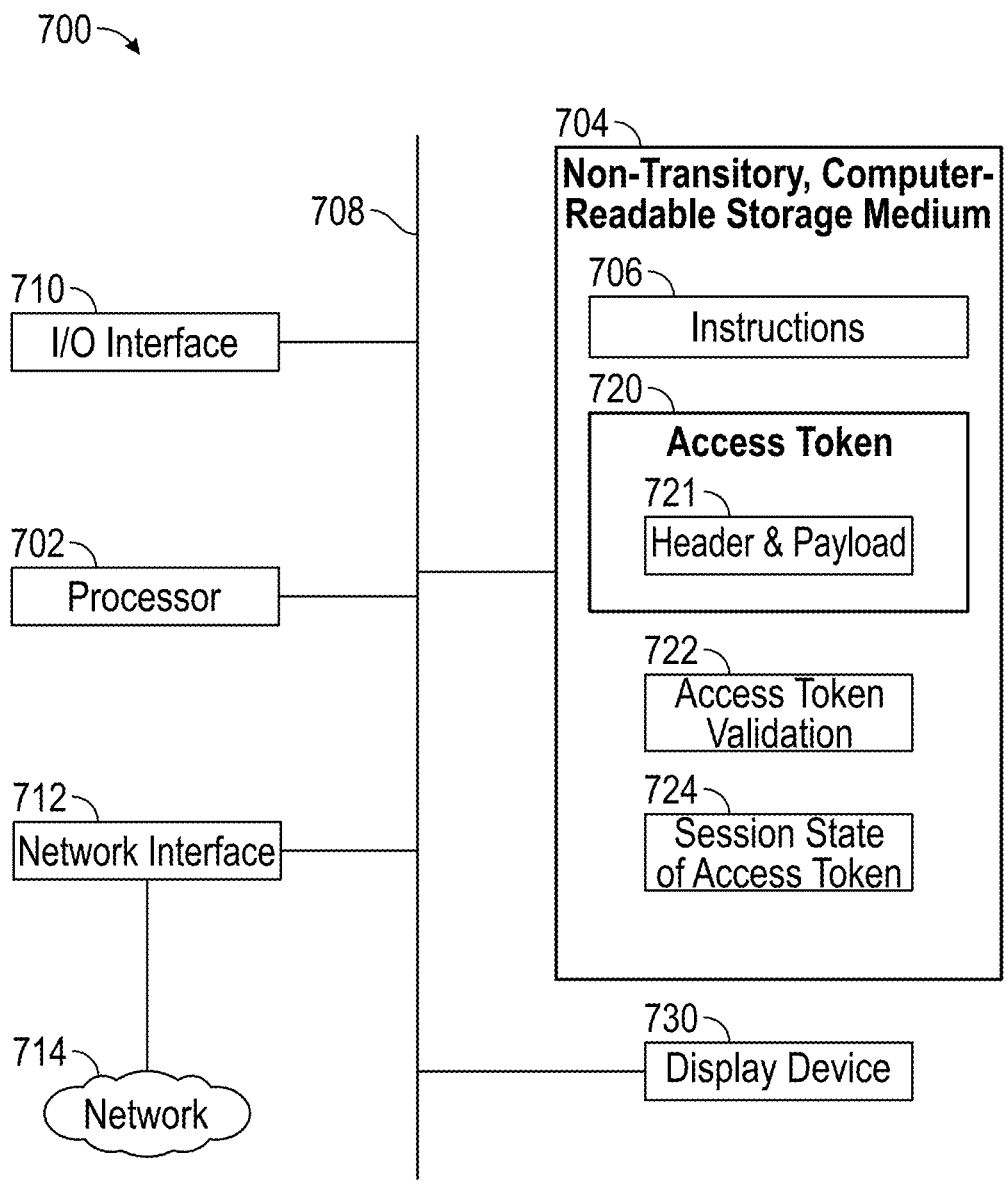
FIG. 7 is a high-level functional block diagram of a processor-based system according to at least one embodiment.

FIG. 7 is a high-level functional block diagram of a Processor-Based System 700 according to at least one embodiment.

In at least one embodiment, Processing Circuitry 700 provides synchronization of a session state associated with a token at an Identity Manager (IDM) and Application Programming Interface (API) Gateway. Processing Circuitry 700 implements synchronization of a session state associated with a token at an IDM and API Gateway using Processor 702. Processing Circuitry 700 also includes a non-transitory, Computer-Readable Storage Medium 704 that is used to implement synchronization of a session state associated with a token at an IDM and API Gateway. Storage medium 704, amongst other things, is encoded with, i.e., stores, Instructions 706, i.e., computer program code that are executed by Processor 702 causes Processor 702 to perform operations for synchronizing a session state associated with a token at an IDM and API Gateway. Execution of Instructions 706 by Processor 702 implements at least a portion of the methods described herein in accordance with one or more embodiments (hereinafter, the noted processes and/or methods). Storage Medium 704 is also able to store the Access Token 720 including the Header and Payload 721. Processor 702 decodes the Header and Payload 721 of Access Token 720 and analyzes the content to validate the Access Token 720, e.g., to verify information in the Access Token 720 and to verify that Access Token 720 has not been tampered with. Storage Medium 704 stores the decoded information as Access Token Validation Information 722. Processor 702 stores in Storage Medium 704 the Session State of the Access Token 724.

Processor 702 is electrically coupled to Computer-Readable Storage Medium 704 via a Bus 708. Processor 702 is electrically coupled to an Input/output (I/O) Interface 710 by Bus 708. A Network Interface 712 is also electrically connected to Processor 702 via Bus 708. Network Interface 712 is connected to a Network 714, so that Processor 702 and Computer-Readable Storage Medium 704 connect to external elements via Network 714. Processor 702 is configured to execute Instructions 706 encoded in Computer-Readable Storage Medium 704 to cause Processing Circuitry 700 to be usable for performing at least a portion of the processes and/or methods. In one or more embodiments, Processor 702 is a Central Processing Unit (CPU), a multi-processor, a distributed processing system, an Application Specific Integrated Circuit (ASIC), and/or a suitable processing unit.

Processing Circuitry 700 includes I/O Interface 710. I/O Interface 710 is coupled to external circuitry. In one or more embodiments, I/O Interface 710 includes a keyboard, keypad, mouse, trackball, trackpad, touchscreen, and/or cursor direction keys for communicating information and commands to Processor 702.

Processing Circuitry 700 also includes Network Interface 712 coupled to Processor 702. Network Interface 712 allows Processing Circuitry 700 to communicate with Network 714, to which one or more other computer systems are connected. Network Interface 712 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 764.

Processing Circuitry 700 is configured to receive information through I/O Interface 710. The information received through I/O Interface 710 includes one or more of instructions, data, design rules, libraries of cells, and/or other parameters for processing by Processor 702. The information is transferred to Processor 702 via Bus 708. Processing Circuitry 700 is configured to receive information from Storage Medium 704 through I/O Interface 710. The information is stored in Computer-Readable Medium 704. Display Device 730 presents information to a user, such as the information stored in Storage Medium 704 as well as status of access to end services.

In one or more embodiments, one or more non-transitory Computer-Readable Storage Medium 704 having stored thereon instructions (in compressed or uncompressed form) that may be used to program a computer, processor, or other electronic device) to perform processes or methods described herein. The one or more non-transitory Computer-Readable Storage Medium 704 include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EE-PROMs), flash memory, magnetic or optical cards, solid-state memory devices, or other types of physical media suitable for storing electronic instructions. In one or more embodiments using optical disks, the one or more non-transitory Computer-Readable Storage Medium 704 includes a Compact Disk-Read Only Memory (CD-ROM), a Compact Disk-Read/Write (CD-R/W), and/or a Digital Video Disc (DVD).

In one or more embodiments, Storage Medium 704 stores computer program code 706 configured to cause Processing Circuitry 700 to perform at least a portion of the processes and/or methods for synchronizing a session state associated with a token at an IDM and API Gateway. In one or more embodiments, Storage Medium 704 also stores information, such as algorithm which facilitates performing at least a portion of the processes and/or methods for synchronization of a session state associated with a token at an IDM and API Gateway. Accordingly, in at least one embodiment, the Processor Circuitry 700 performs a method for synchronizing a session state associated with a token at an IDM and API Gateway. The process for synchronizing a session state associated with a token at an IDM and API Gateway includes receiving, from a client device, an access token and a first request for access to an end service, determining whether the access token meets a first condition, in response to the access token being determined to meet the first condition, sending, to a distributed cache maintaining a session state of the access token, a second request for the session state associated with the access token, receiving, from the distributed cache, a session state response indicating the status of the session state associated with the access token, performing authentication of the access token based on the session state response indicating the status of the session state associated with the access token, in response to the status of the session state in the session state response indicating the access token being authenticated, forwarding the first request for access to the end server to the end service, and in response to the status of the session state in the session state response indicating the access token not being authenticated, generating an authentication error. The process for synchronizing a session state associated with a token at an IDM and API Gateway provides enhanced security so an access token is not able to be used a user logs out of the IDM or the IDM otherwise removes the session state from the distributed cache. Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method providing synchronized session state of an access token in a system, comprising:
   receiving, from a client device, the access token and a first request for access to an end service;
   determining whether the access token meets a first condition;
   in response to the access token being determined to meet the first condition, sending, to a distributed cache maintaining a session state of the access token, a second request for the session state associated with the access token;
   receiving, from the distributed cache, a session state response indicating a status of the session state associated with the access token;
   performing authentication of the access token based on the session state response indicating the status of the session state associated with the access token;
   in response to the status of the session state in the session state response indicating the access token being authenticated, forwarding the first request for access to an end server to the end service;
   in response to the status of the session state in the session state response indicating the access token not being authenticated, generating an authentication error; and
   putting a token state into the distributed cache and, upon logout of the client device, removing the token state from the distributed cache by an identity manager that provided the access token to the client device.

2. The method of claim 1 further comprising in response to forwarding the first request to the end service, receiving an end service response from the end service and forwarding the end service response from the end service to the client device.

3. The method of claim 1 further comprising in response to generating the authentication error, sending an error message to the client device.

4. The method of claim 1, wherein the receiving, from the client device, the access token includes receiving, from the client device, a JSON (JavaScript Object Notation) Web Token (JWT).

5. The method of claim 1, wherein the determining the access token meets the first condition includes determining the access token is valid and not expired.

6. The method of claim 1, wherein the determining whether the access token meets the first condition includes determining the access token does not meet the first condition.

7. The method of claim 1, wherein the determining the access token does not meet the first condition includes determining the access token is invalid or determining the access token is expired, generating the authentication error based on the determining the access token is invalid or determining the access token is expired, and sending the client device an error message in response to generating the authentication error.

8. An Application Programming Interface (API) Gateway, comprising:
   a memory storing computer-readable instructions; and
   a processor connected to the memory, wherein the processor is configured to execute the computer-readable instructions to:
   receive, from a client device, an access token and a first request for access to an end service;
   determine whether the access token meets a first condition;
   in response to the access token being determined to meet the first condition, send a second request for a session state associated with the access token to a distributed cache maintaining the session state of the access token;
   receive, from the distributed cache, a session state response indicating a status of the session state associated with the access token;
   perform authentication of the access token based on the session state response indicating the status of the session state associated with the access token;
   in response to the status of the session state in the session state response indicating the access token being authenticated, forward the first request for access to an end server to the end service;
   in response to the status of the session state in the session state response indicating the access token not being authenticated, generate an authentication error; and
   putting a token state into the distributed cache and, upon logout of the client device, removing the token state from the distributed cache by an identity manager that provided the access token to the client device.

9. The API Gateway of claim 8, wherein the processor is further configured to, in response to forwarding the first request to the end service, receive an end service response from the end service and forwarding the end service response from the end service to the client device.

10. The API Gateway of claim 8 wherein the processor is further configured to, in response to generating the authentication error, send an error message to the client device.

11. The API Gateway of claim 8, wherein the access token includes a JSON (JavaScript Object Notation) Web Token (JWT).

12. The API Gateway of claim 8, wherein the processor is further configured to determine the access token meets the first condition by determining the access token is valid and not expired.

13. The API Gateway of claim 8, wherein the processor is further configured to determine whether the access token meets the first condition by determining the access token does not meet the first condition.

14. The API Gateway of claim 8, wherein the processor is further configured to determine the access token does not meet the first condition by determining the access token is invalid or determining the access token is expired, generating the authentication error based on the determining the access token is invalid or the determining the access token is expired, and sending the client device an error message in response to generating the authentication error.

15. A non-transitory computer-readable media having computer-readable instructions stored thereon, which when executed by a processor causes the processor to perform operations comprising:
   receiving, from a client device, an access token and a first request for access to an end service;
   determining whether the access token meets a first condition;
   in response to the access token being determined to meet the first condition, sending, to a distributed cache maintaining a session state of the access token, a second request for the session state associated with the access token;
   receiving, from the distributed cache, a session state response indicating a status of the session state associated with the access token;
   performing authentication of the access token based on the session state response indicating the status of the session state associated with the access token;
   in response to the status of the session state in the session state response indicating the access token being authenticated, forwarding the first request for access to an end server to the end service;
   in response to the status of the session state in the session state response indicating the access token not being authenticated, generating an authentication error; and
   putting a token state into the distributed cache and, upon logout of the client device, removing the token state from the distributed cache by an identity manager that provided the access token to the client device.

16. The non-transitory computer-readable media of claim 15 further comprising in response to forwarding the first request to the end service, receiving an end service response from the end service and forwarding the end service response from the end service to the client device.

17. The non-transitory computer-readable media of claim 15 further comprising in response to generating the authentication error, sending an error message to the client device.

18. The non-transitory computer-readable media of claim 15, wherein the determining the access token meets the first condition includes determining the access token is valid and not expired, and wherein the receiving, from the client device, the access token includes receiving, from the client device, a JSON (JavaScript Object Notation) Web Token (JWT).

19. The non-transitory computer-readable media of claim 15, wherein the determining whether the access token meets the first condition includes determining the access token does not meet the first condition.

20. The non-transitory computer-readable media of claim 15, wherein the determining the access token does not meet the first condition includes determining the access token is invalid or determining the access token is expired, generating the authentication error based on the determining the access token is invalid or determining the access token is expired, and sending the client device an error message in response to generating the authentication error.

\* \* \* \* \*